United States Patent [19]
Niki et al.

[11] Patent Number: 5,835,845
[45] Date of Patent: Nov. 10, 1998

[54] COMMUNICATION SYSTEM OF MULTI-CHANNEL ACCESS

[75] Inventors: Atsuyoshi Niki, Koganei; Ichiro Maeda, Tama; Takao Fukushima, Hanno, all of Japan

[73] Assignee: Hitachi Denshi Kabushiki Kaisha, Tokyo, Japan

[21] Appl. No.: 593,709

[22] Filed: Jan. 29, 1996

[30] Foreign Application Priority Data

Feb. 2, 1995 [JP] Japan ................................. 7-015928

[51] Int. Cl.⁶ ................................................. H04N 7/173
[52] U.S. Cl. .............................. 455/5.1; 348/12; 455/519
[58] Field of Search ................................. 348/6, 7, 10, 11, 348/12, 13; 455/4.2, 5.1, 6.1, 6.2, 6.3, 500, 507, 517, 518, 519; H04N 7/173

[56] References Cited

U.S. PATENT DOCUMENTS 5,101,502 3/1992 Felderman et al. ........................ 455/34
5,335,350 8/1994 Felderman et al. ...................... 455/519

FOREIGN PATENT DOCUMENTS

| 04117859A | 4/1992 | Japan . |
| 2271690 | 4/1994 | United Kingdom . |
| WO9115932A | 10/1991 | WIPO . |
| WO9423525 | 10/1994 | WIPO . |

Primary Examiner—Chris Grant
Attorney, Agent, or Firm—Antonelli, Terry, Stout & Kraus, LLP

[57] ABSTRACT

A method and system for supervising communications a multi-channel access communication system having a plurality of terminals connected to a plurality of communication channels. The terminals are classified into a plurality of groups each including at least one terminal. When a group calls another group, it is checked by referring to a management table if there is any terminal in communications in the called group. If there is a terminal in communications, the call is invalidated.

6 Claims, 6 Drawing Sheets

|        | GROUP1 | GROUP2 | GROUP3 | GROUP4 | GROUP5 |
|--------|--------|--------|--------|--------|--------|
| GROUP1 | 1 | 1 | 1 | 0 | 0 |
| GROUP2 | 1 | 1 | 0 | 0 | 1 |
| GROUP3 | 1 | 0 | 1 | 1 | 0 |
| GROUP4 | 0 | 0 | 1 | 1 | 0 |
| GROUP5 | 0 | 1 | 0 | 0 | 1 |

1: OVERLAPPED

0: NOT OVERLAPPED

| GROUP 1 | x |
|---------|---|
| GROUP 2 | x |
| GROUP 3 | x |
| GROUP 4 | x |
| GROUP 5 | x | x = 1 : COMMUNICATING x = 0 : NOT COMMUNICATING

COMMUNICATION SYSTEM OF MULTI-CHANNEL ACCESS

BACKGROUND OF THE INVENTION

The present invention relates to a communication system of multi-channel access.

In a communication system of multi-channel access (hereinafter called MCA system), a plurality of communication channels are shared by a plurality of users. One example of MCA systems is an MCA/C (Multi-Channel Access on Cable) system. The MCA/C system provides users with telephone and facsimile services in addition to television broadcasting services, in a bi-directional CATV system.

According to the standard allocation of a carrier signal in an MCA/C system, a frequency bandwidth of 6 MHz per one channel is assigned for one television broadcasting signal inclusive of a video signal and a voice signal. A plurality of television broadcasting channels are distributed over the frequency band usable by each CATV system.

In the CATV system, a line for transmitting a signal from a subscriber terminal to a base station called a head end is called an "up-line", and a line for transmitting a signal from the head end to a subscriber terminal is called a "down-line". Different frequencies are used at the up- and down-lines.

Telephone services use a vacant frequency band in the CATV broadcasting band not used by television broadcast. The frequency band assigned to telephone and facsimile communications is 6 MHz per one channel of each up- or down-line. The MCA/C system has been proposed by "Survey and Study Group for Propagation and Promotion of Highly Integrated Information and Communication Systems" at the Ministry of Posts and Telecommunications in Japan.

Telephone services are offered through frequency division multiple access (hereinafter simply called FDMA) using signals in the voice band. Of the bandwidth of 6 MHz assigned to telephone services, the usable frequency band (hereinafter called a use-band) is set to 2.5 MHz or narrower in order to avoid interference with television broadcast. The use-band has 200 carriers (channels) at the maximum, a frequency interval being defined to be an integer multiple of 12.5 MHz which is a narrow bandwidth of an FM transceiver. These technical requirements are stipulated in the proposals given by "Survey and Study Group for Propagation and Promotion of Highly Integrated Information and Communication Systems".

Each of 200 channels for telephone services has a control channel and a speech channel. The control channel is used for digital switch control, and the speech channel is used for transmitting a speech signal through analog frequency division multiplex. Telephone communications between subscribers are established via the head end (base station). In telephone communications, an up-line signal frequency is converted by a converter at the head end into a down-line signal frequency. Connection between telephone subscribers is controlled by designating a carrier frequency as a cross point.

FIG. 5 is a block diagram showing an example of an MCA/C system operating on shared parts of the facilities of a CATV system. In FIG. 5, reference numeral 1 represents a head end as a base station which is located at the central service area of the CATV system. A plurality of trunk cables 2a to 2d extend from the head end 1 to each route.

The head end 1 includes an input/output distributer 1—1 which is a branch/connection unit for the trunk cables 2a to 2d. Connected to the distributer 1—1 are a CATV broadcasting facility 1-2 and a block converter (or transceiver) 1-3. Via the block converter 1-3, a line controller 1-4 is connected to the distributer 1—1.

The trunk cables 2a to 2d are provided for respective routes, for example, four routes corresponding to the east, west, south, and north as in the case of FIG. 5. The route trunk cables 2a to 2d are extended through cascade connection of, for example, bi-directional repeaters 2a-1 and 2a-2. As shown in FIG. 5, a branch cable 3 is branched from the bi-directional repeater 2a-1, and further branched to subscriber terminals 4-1 and 4-2 from tap-off points 3-1 and 3-2 of the branch cable 3. The whole CATV system constitutes a tree network.

Installed at each terminal (terminal station) 4-1, 4-2 are a splitter 401, a television receiver 402, a line termination equipment 403, a telephone 404, and other equipments. Reception of multi-channel television broadcast as well as CATV service area communications by telephones or the like similar to wire broadcast telephones, can be performed. For the service area communications, bi-directional communications are performed using an up-line from a subscriber to the head end and a down-line from the head end to a subscriber.

The line termination equipment 403 executes a call and connection establishment operation of the MCA/C system through line control and data transfer. The line termination equipment 403 also performs signal conversion between a CATV RF signal and a terminal AF signal, and requests a call, upon reception of a callee dial number signal inputted from a terminal, by converting it and transmitting the converted signal to the line controller 1-4.

A low split scheme is prevailing as a CATV channel allocation, in which the up-line band is set to 10 to 50 MHz and the down-line band is set to 70 to 300 MHz or 450 MHz. In the MCA/C system, of these bands, the up-line band is set to 6 MHz, for example, from 42 to 48 MHz, and the down-line band is also set to 6 MHz, for example, from 230 to 236 MHz. As stated earlier, the use-band is set to 2.5 MHz or narrower with 200 channels at the maximum.

This system is called an MCA/C system because it is assumed to operate on a CATV system. However, it is not necessarily required to configure a signal transfer system by using cables. Therefore, the communication system of multi-channel access is generally called an MCA system.

FIG. 6 is a schematic diagram illustrating the concept of multiple communication lines of the above-described MCA/C system. C-u1 and C-u2 represent up-line control channels, S-u1 and S-u2 represent up-line speech channels, C-d1 and C-d2 represent down-line control channels, and S-d1 and S-d2 represent down-line speech channels. As illustrated by broken lines, the block converter 1-3 converts each up-line use-band into a corresponding down-line use band.

In the diagram of FIG. 6 illustrating the concept of multiple communication lines, a plurality of up- and down-line communication lines are depicted in order to facilitate the description of line connections. However, actually, bi-directional communications over a plurality of different up- and down-line channels are realized by a single communication cable (such as branch cable 3) through frequency division multiplex transmission. Different communication channel lines shown in FIG. 6 correspond to different frequencies. Also in FIG. 6, each communication channel line intersects with two lines extended from the line controller 1-4 or line termination equipment 403. These virtual cross points each are closed when the line termination equipment 403 sets a channel line corresponding to the frequency designated by the line controller 1-4. The virtual cross points are not physical points but logical points. A white circle cross point indicates that a communication channel between the line controller or line termination equipment and the block converter is opened. A solid black cross point indicates that the line controller or line termination equipment is connected to the communication channel. Such line connection operations are controlled by designating or selecting a channel frequency.

It is assumed that the subscriber terminal 4-1 is a caller and the subscriber terminal 4-2 is a callee. First, the caller 4-1 transmits a signal having the frequency of the control channel C-u1 so that the virtual cross point $\underline{a}$ is closed and a connection request signal containing a callee dial number is transmitted over the control channel C-u1.

Then, the line controller 1-4 at the head end 1 receives this connection request signal because the frequency of the control channel C-u1 is used and so the virtual cross point $\underline{b}$ is closed. Thereafter, a connection response signal is transmitted over the control channel C-d2 because the frequency of the control channel C-d2 is next used and so the virtual cross point $\underline{c}$ is closed.

Next, the caller and callee close the virtual cross points $\underline{d}$ and $\underline{e}$ to receive this signal, and then speech communications start using the speech channel designated by the line controller 1-4. Specifically, on the caller 4-1 side, the virtual cross point $\underline{f}$ is closed to speak over the speech channel S-u1, and on the callee 4-2 side, the virtual cross point $\underline{g}$ is closed to receive a speech signal sent from the caller over the speech channel S-d1 via the block converter 1-3. Then, the virtual cross point $\underline{h}$ is closed so that the callee 4-2 can speak over the speech channel S-u2. On the caller 4-1 side, the virtual cross point $\underline{i}$ is closed to receive a speech signal sent over the speech channel S-d2. In this manner, simultaneous bi-directional transmission/reception becomes possible.

In the above description, although frequency division multiplex is used, it is obvious that other multiplex accesses such as time division multiplex and code division multiplex are also applicable.

In communication systems of multi-channel access, there is a system having a so-called group call function in which a plurality of terminals such as subscribers 4-1, 4-2 are classified into groups with some terminals belonging to a plurality of groups, and terminals can be called in the unit of group. Such a system can utilize the multi-channel access function more effectively.

Such a group call function is used for services such as communications (broadcast) of a single subscriber terminal with a plurality of subscriber terminals and communications (e.g., conference via communication channels) between a plurality set of terminals and another plurality set of terminals.

In a conventional system having such a group call function, however, a group call is acknowledged if only it is judged that this group is not in communications with another terminal or group.

Specifically, in using the group call function, this conventional system does not consider the case where some terminals among a plurality of terminals of the system belong to a plurality of groups in an overlap manner. Therefore, some terminals in the called group cannot be accessed if the terminals are in communications with another terminal or group.

Consider for example the case where as shown in FIG. 2, a plurality of terminals A, B, C, D, E, F, and G are classified into groups 1 and 2 and the terminals D and E belong to both the groups 1 and 2. It is assumed that while the group 1 is communicating with the other terminal (or group) X, i.e., while the terminals A, B, C, D, and E are communicating with the terminal (or group) X, another terminal (or group) Y calls the group 2 as shown in FIG. 3. In FIG. 3, the slant hatching indicate the communicating terminals, and while no hatching indicate terminals in no communication. In this case, since the group 2 is not communicating with the terminal (or group) X, the base station (head end) transmits a call signal via the control channel to the terminals D, E, F, and G in the group 2.

Therefore, although the terminals F and G among the terminals belonging to the group 2 receive this call signal and start communicating with the terminal (or group) Y, the terminals D and E of the group 2 cannot receive the call signal from the terminal (or group) Y because they are in communications with the terminal (or group) X, and continue the communications of the group 1 with the terminal (or group) X as shown in FIG. 4. In FIG. 4, every terminal of group 1 is communicating with the other terminal X, and while the terminals F and G of group 2 are communicating with the other terminal Y. The terminals D and E of group 2 are not communicating with the terminal Y.

Accordingly, if some groups belong to a plurality of groups in an overlap manner, the terminals in one group in communications with one terminal or group cannot participate in new group communications.

Also in this case, a new group communication caller is not informed about a presence of terminals not participated in the group communications. In communications, particularly in broadcast communications in which a caller broadcasts a message to all terminals of a group, some terminals may be unable to receive the broadcast message and the caller cannot be informed of this fact.

SUMMARY OF THE INVENTION

It is an object of the present invention to provide a communication system of multi-channel access, capable of providing a reliable group call function at any time even if there are some terminals belonging to a plurality of groups of the communication system and strictly eliminating any possibility of terminals left uncalled during a group call.

The above object can be achieved by providing apparatus for supervising a communication state of terminals belonging to each group. This apparatus is used for invalidating a group call if the group has any terminal in communications with another group.

If a group has any terminal in communications, the call to the group is invalidated so that the group call function becomes valid only when all the terminals of the group are on standby. Accordingly, there is no terminal not participating in group communications when a group call is made valid.

DETAILED DESCRIPTION OF THE PREFERRED EMBODIMENTS

A communication system of multi-channel access according to an embodiment of the invention will be detailed with reference to the accompanying drawings.

Figure 5:
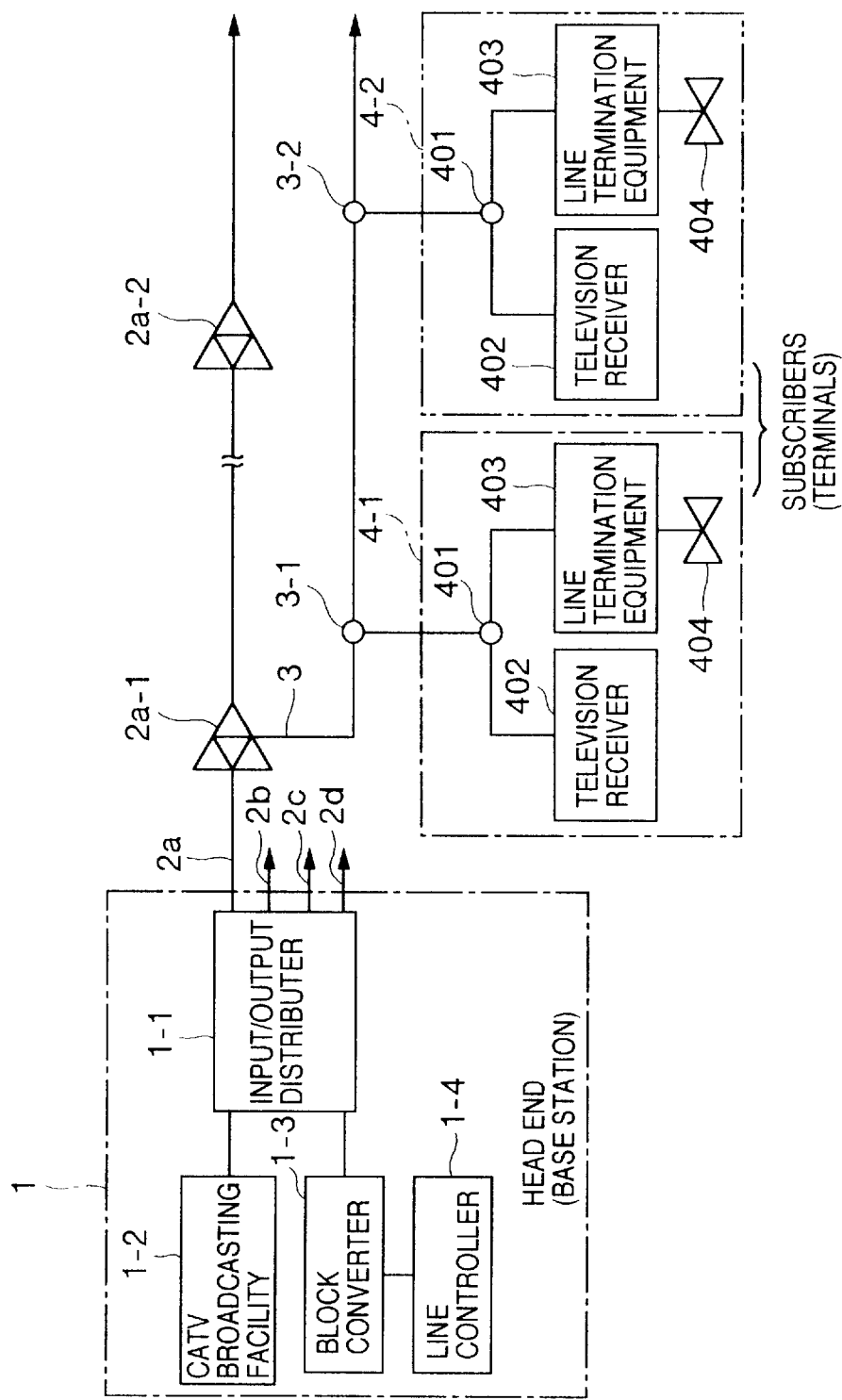
FIG. 5 is a block diagram illustrating a communication system of multi-channel access to be applied to the present invention.
Figure 6:
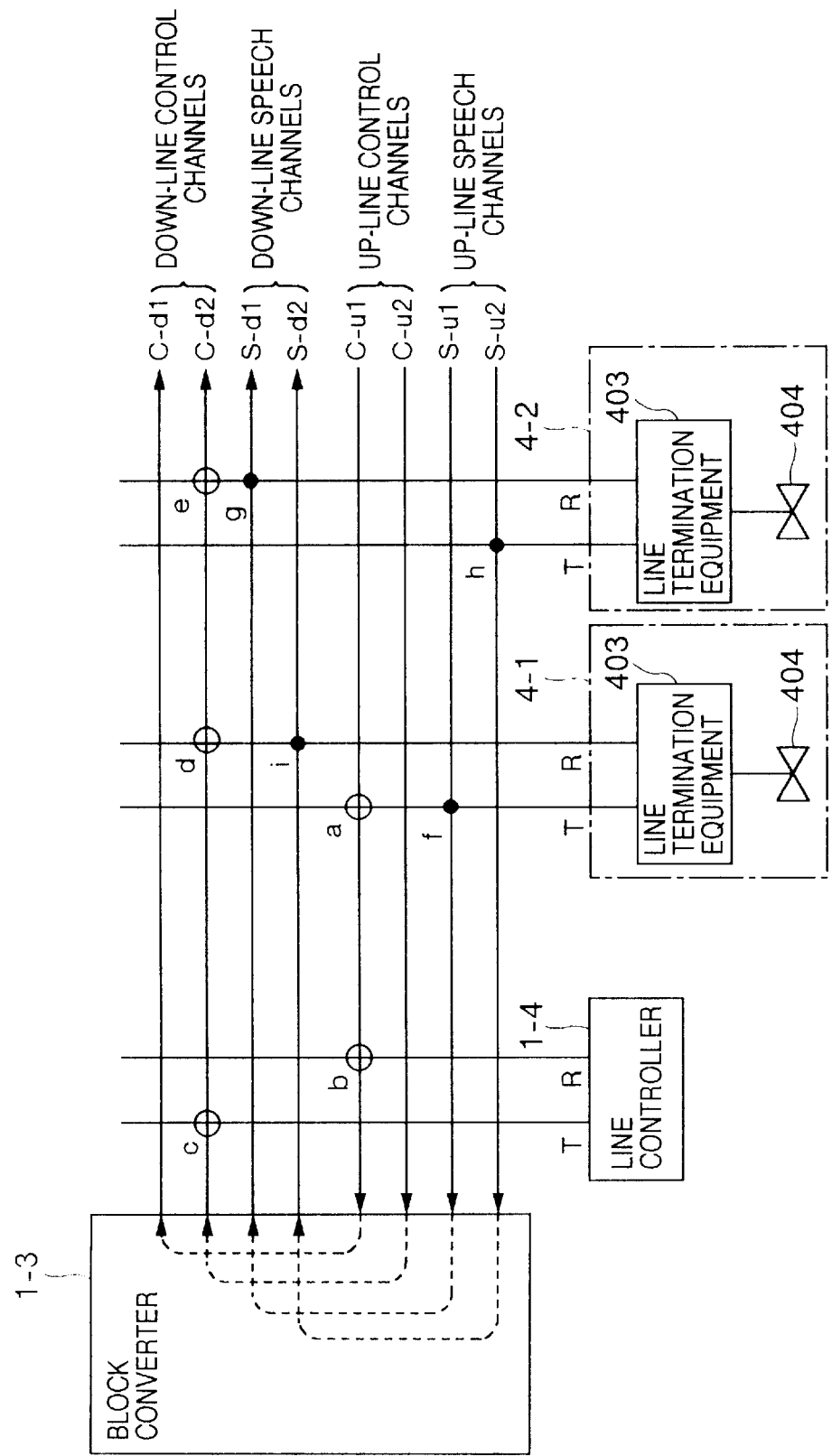
FIG. 6 is a schematic diagram illustrating the concept of a communication system of multi-channel access to be applied to the present invention.

The main structure of a communication system of multi-channel access of this invention is the same as that described with FIGS. 5 and 6, with the difference being in the control performed by the line controller 1-4 of the head end (base station) 1.

The control performed by the line controller 1-4 according to the embodiment of this invention will be described.

Figure 8:
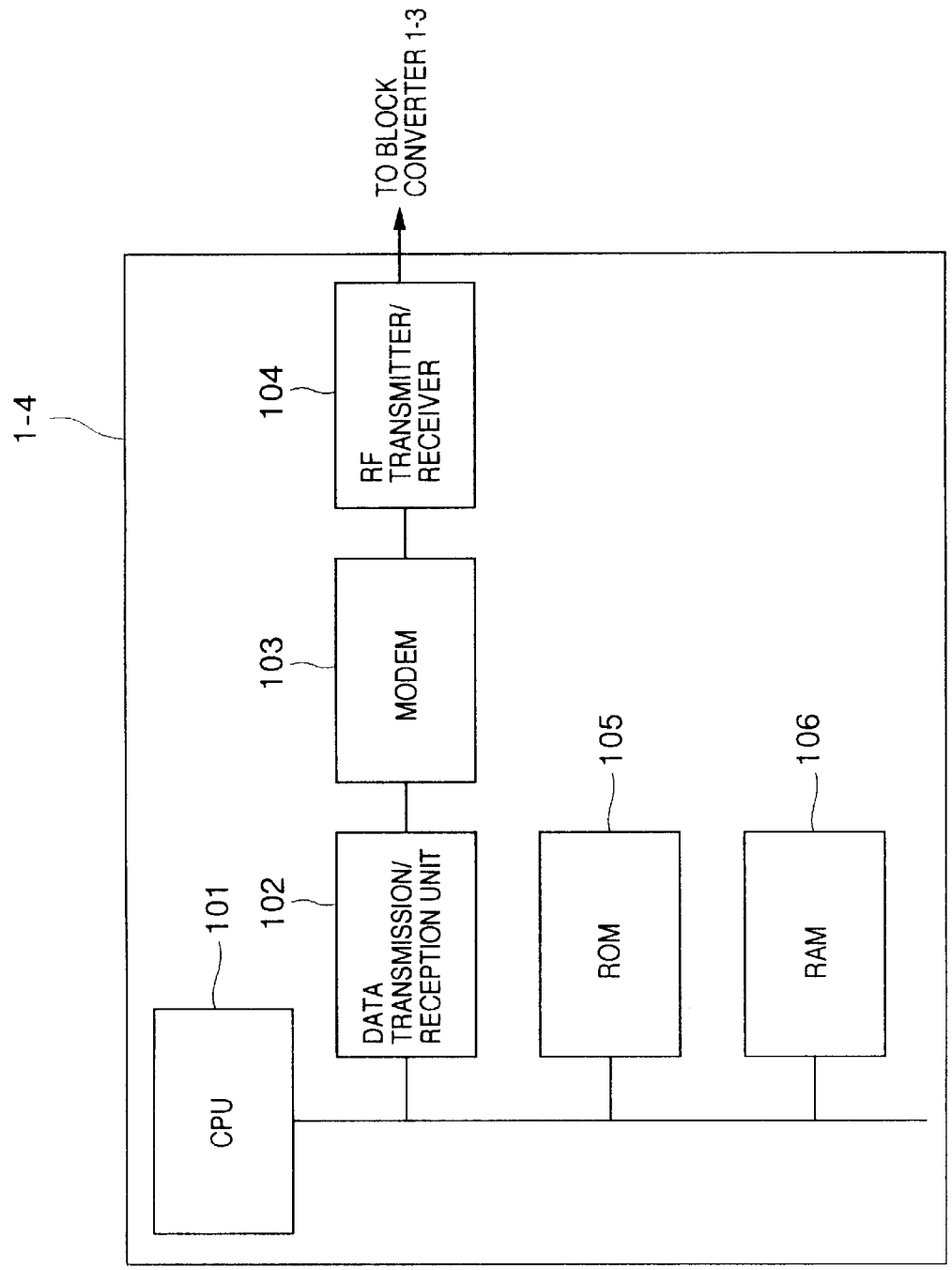
FIG. 8 is a block diagram of the line controller 1-4.

FIG. 8 is a block diagram of the line controller 1-4. The line controller 1-4 includes a Central Processing Unit (CPU) 101, a data transmission/reception unit 102, a modem 103, a RF transmitter/receiver unit 104, ROM 105 and RAM 106 which are connected together with a bus line and signal lines.

The line termination equipment 403 makes the line controlling and data transmition/reception to operate the calling and incoming of MCA/C and the communication under the controlling by the line controller 1-4.

Upon the user's operation, the line termination equipment 403 at the transmission side transmits a calling request to the line controller 104 of the head end 1. When the calling request is acceptable, the line controller 1-4 transmits a channel designation to both of the line termination equipments 403 at the transmission side and the reception side.

Each of the line termination equipments 403 of the transmission side and the reception side shifts it's channel (frequency) to the other one designated by the channel designation from the line controller 1-4. As result, the virtual cross points are closed to make the communication available to start between the line termination equipments 403 of the transmission side and the reception side.

In this embodiment, the line controller 1-4 is provided with a group management function for supervising a communication state of terminals (4-1, . . . ) of each group and storing, in a table shown in FIG. 1, management information on whether each terminal belonging to groups in an overlapped manner. This group management function is executed by the CPU 101 according to the software program stored in the ROM 105.

Figures 1A, 1B, 2:
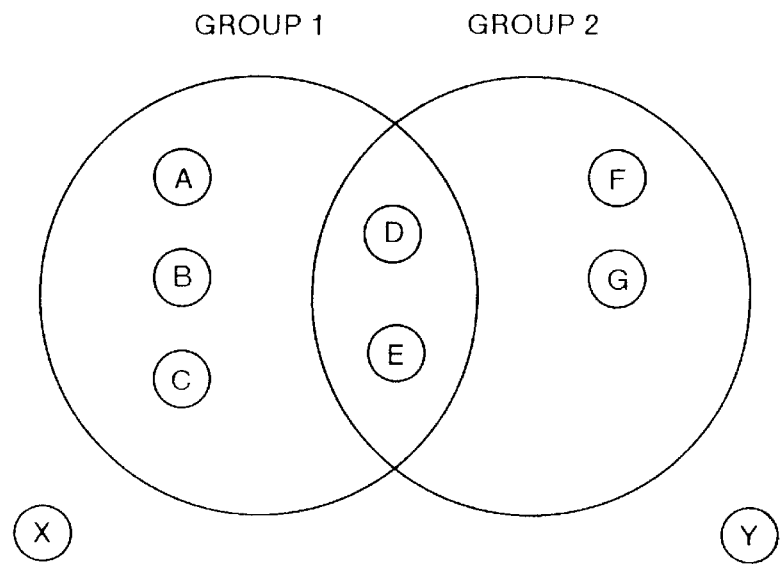
FIGS. 1A and 1B are data tables used by a communication system of multi-channel access according to an embodiment of the invention.
FIG. 2 is a diagram illustrating terminals belonging to two groups.
Figure 3:
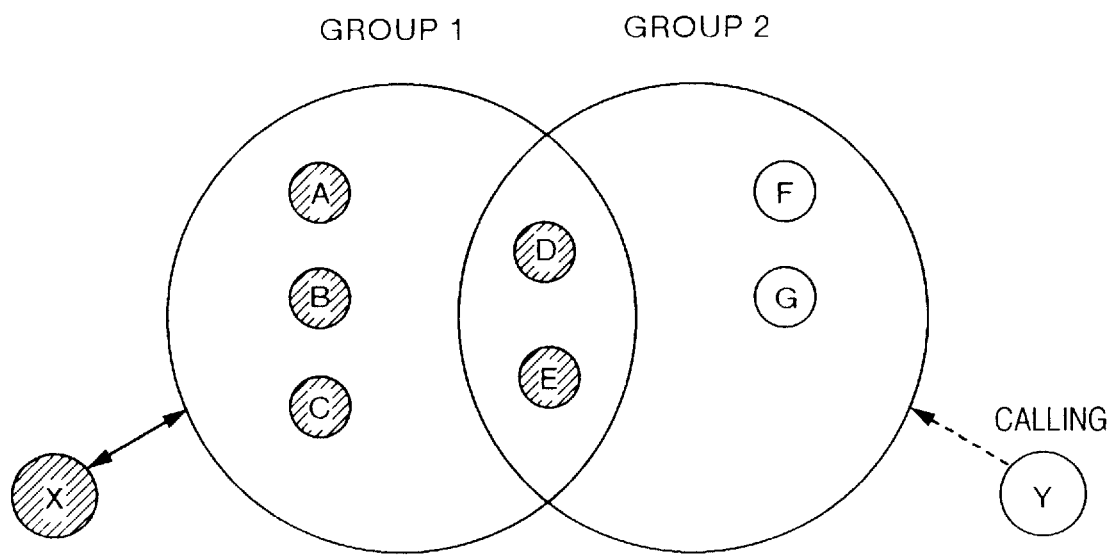
FIG. 3 is a diagram illustrating a group call according to an embodiment of the invention.
Figure 4:
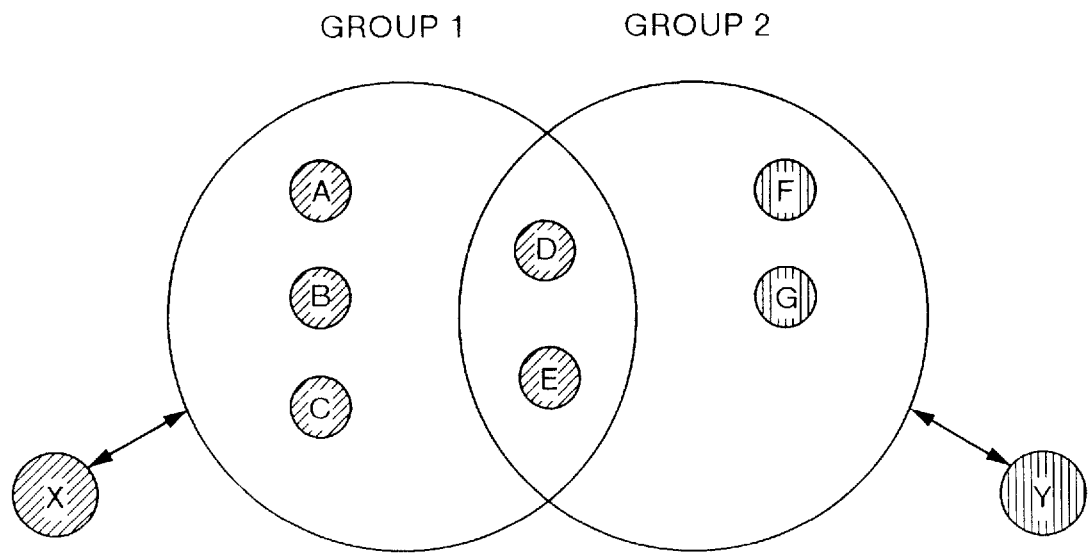
FIG. 4 is a diagram illustrating a group call according to a conventional method.

In the table shown in FIG. 1A it is assumed that the number of groups in the system is five. In the table, "1" (overlapped) is set if there is a terminal in communications among the terminals belonging to multiple groups, and "0" (not overlapped) is set if there is no terminal in communications among the terminals belonging to multiple groups. For example, group 1 has the communication terminals belonging to the other groups 2 and 3, and has no terminals belonging to the groups 4 and 5.

FIG. 1B is another table which indicates the status of communication in each of the groups 1-5. In the communication management table shown in FIG. 1B, when x at a certain group is "1", this group is communicating with the other group or terminal, and when x is "0", the group is not communicating with any other group or terminal. These tables shown in FIGS. 1A and 1B are managed by the line controller 1-4.

When a terminal calls a group, for example, the group 2, the group supervising function of the line controller 1-4 checks the row of the group 2 of the tables shown in FIGS. 1A and 1B.

Figure 7:
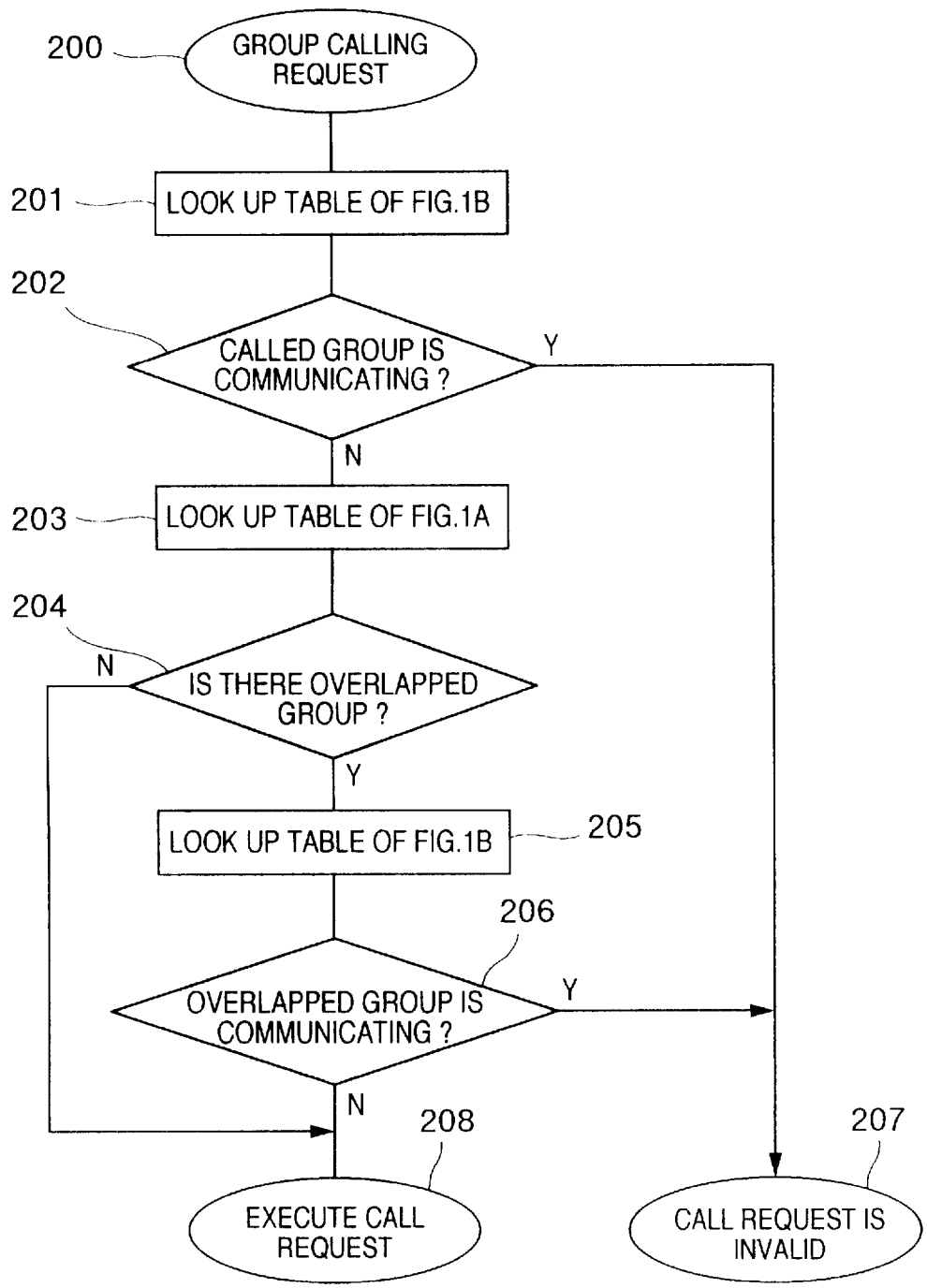
FIG. 7 is a flow chart of the group management function executed by the line controller 4-1.

FIG. 7 is a flow chart of the group management function executed by the line controller 4-1. When a group call request is received at the line controller 1-4, the present status of the called group is checked by looking up the table of FIG. 1B at step 201. When the table of FIG. 1B indicates that the called group is communicating (x=1) with the other group or terminal (step 202), the group call request is made invalid. (step 207) When the table of FIG. 1B indicates that the called group is not communicating (x=0) with the other group or terminal (step 202), another table shown in FIG. 1A is checked. (step 203) If the called group includes the overlapped terminals belonging to the other groups, the present status of the such other groups is checked by looking up the table of FIG. 1B at step 205. When the table of FIG. 1B indicates that the other groups are not in communicating status (x=0) at step 206, the group call request is valid and executed.

In the example of the table shown in FIG. 1A, the group 2 is overlapped with the groups 1 and 5.

In this example, the group supervising function of the line controller 1-4 invalidates a call to the group 2 if there is even one terminal in communications in the groups 1 and 5, and informs the caller of the group 2 of an invalid call.

A notice of this invalid call may be performed, for example, by sending a busy tone like a telephone line back to the caller.

Consider, for example, the case shown in FIG. 2 where there are a group 1 with terminals A, B, C, D, and E and a group 2 with terminals D, E, F, and G. In this case, not only if the group 1 is in group communications, i.e., if all terminals A, B, C, and D are in communications, but also if even one terminal is in communications during a group idle state of the group 1, then a call to the group 2 is invalidated. As a result, the group call request is invalid, however in the terminals belonging to the group 2, only the terminals D and E belonging to both the groups 1 and 2 are absolutely protected from an inability of participating in the communications to the group 2 (an inability of listening to the broadcast).

As already described with FIGS. 5 and 6, signal transmission lines such as trunk cables 2a to 2d and the branch cable 3 of the communication system of multi-channel access applied to this invention are made of coaxial cables through which high frequency electric signals are transmitted to send information. Instead of coaxial cables, optical cables may be used to form transmission lines through which high frequency optical signals are transmitted.

Signal transmission lines of the communication system of multi-channel access may be radio wave transmission lines.

Not only analog electric signals but also digital electric signals may be used for transmitting information.

As described so far, according to the present invention, if there is even one terminal in communications among those terminals belonging to a plurality of groups, a new call to all the groups having the terminal in communications is made invalid, and the caller to these groups is informed of this fact. Accordingly, it is possible to strictly eliminate an occurrence of any terminals left uncalled during a group call and to perform a reliable group call function.

What is claimed is:

1. A multi-channel access communication system for communicating between a plurality of terminals through a transmission medium and a base station, comprising:

a plurality of said terminals classified into a plurality of groups, in which at least one terminal belongs to both a first group and a second group, wherein said transmission medium transmits control signals and information signals between said terminals, and wherein said base station comprises:

a memory which stores communication status data of said terminals in each of said groups, and line control means for providing a group call function for calling all terminals belonging in each group and invalidating a group call request from a terminal in a third group to said second group in accordance with said communication status data of said memory when said one terminal belonging to said first group and said second group is in a communication state with any other terminal.

2. A multi-channel access communication system according to claim 1, wherein said transmission medium is one of a coaxial cable line for transmitting a high frequency electric signal and an optical cable line for transmitting a high frequency optical signal.

3. A multi-channel access communication system according to claim 1, wherein said transmission medium is a radio wave transmission line.

4. A multi-channel access communication system according to claim 1, wherein said memory has stored therein a table, in which said communication status data of said terminals are stored.

5. A method of calling a terminal of a multi-channel access communication system having a plurality of terminals connected to communication channels and classified into a plurality of groups, in which at least one terminal belongs to at least two groups, said method comprising the steps of:

calling one of the groups;

judging whether said one terminal is included in communications in the called group; and issuing a notice of an invalid call, when said one terminal is included in the communications, wherein said judging step comprises the steps of:

identifying the called group, identifying another group having an overlapped terminal belonging also to the called group by referring to a group management table, judging if the other group having the overlapped terminal is in communications, and if the other group is in communications, indicating that a terminal is in communications.

6. A method of calling a terminal of a multi-channel access communication system having a plurality of terminals connected to communication channels and classified into a plurality of groups, in which at least one terminal belongs to at least two groups, said method comprising the steps of:

receiving a group call request from a terminal to one of the groups;

identifying the called group;

identifying another group having an overlapped terminal belonging to the called group by referring to a group management table;

judging whether said another group having the overlapped terminal is in communications; and when said another group is in communications, issuing an notice of an invalid group call request.

* * * * *